US010678196B1

(12) United States Patent
Al-Turki et al.

(10) Patent No.: US 10,678,196 B1
(45) Date of Patent: Jun. 9, 2020

(54) SOFT SENSING OF A NONLINEAR AND MULTIMODE PROCESSES BASED ON SEMI-SUPERVISED WEIGHTED GAUSSIAN REGRESSION

(71) Applicant: King Abdulaziz University, Jeddah (SA)

(72) Inventors: Yusuf Al-Turki, Jeddah (SA); Abdullah Abusorrah, Jeddah (SA); XuDong Shi, Shanghai (CN); Qi Kang, Shanghai (CN); MengChu Zhou, Newark, NJ (US)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/773,120

(22) Filed: Jan. 27, 2020

(51) Int. Cl.
  *G05B 13/04* (2006.01)
  *G05B 13/02* (2006.01)
  *G06N 20/00* (2019.01)
  *G06K 9/62* (2006.01)

(52) U.S. Cl.
  CPC ....... *G05B 13/041* (2013.01); *G05B 13/0265* (2013.01); *G06K 9/6259* (2013.01); *G06N 20/00* (2019.01)

(58) Field of Classification Search
  CPC .. G05B 13/041; G05B 13/0265; G06N 7/005; G06N 20/00; G06K 9/6259
  See application file for complete search history.

(56) References Cited

U.S. PATENT DOCUMENTS

| 9,791,852 B2 * | 10/2017 | Lou | F01K 13/02 |
|---|---|---|---|
| 2006/0217870 A1 * | 9/2006 | Hoff | G05B 23/0254 701/100 |
| 2007/0174808 A1 * | 7/2007 | Beale | G06F 30/39 716/106 |
| 2014/0310228 A1 * | 10/2014 | Nakabayashi | G06N 7/005 706/52 |

(Continued)

OTHER PUBLICATIONS

Xiaofeng Yuan, Yalin Wang, Chunhua Yang, Weihua Gui, Lingjian Ye, "Probabilistic density-based regression model for soft sensing of nonlinear industrial processes," Journal of Process Control, vol. 57, 2017, pp. 15-25 (Year: 2017).*

*Primary Examiner* — Christopher E. Everett
(74) *Attorney, Agent, or Firm* — W&C IP

(57) ABSTRACT

Soft sensing of nonlinear and multimode industrial processes given a limited number of labeled data samples is disclosed. Methods include a semi-supervised probabilistic density-based regression approach, called Semi-supervised Weighted Gaussian Regression (SWGR). In SWGR, different weights are assigned to each training sample based on their similarities to a query sample. Then a local weighted Gaussian density is built for capturing the joint probability of historical samples around the query sample. The training process of parameters in SWGR incorporates both labeled and unlabeled data samples via a maximum likelihood estimation algorithm. In this way, the soft sensor model is able to approximate the nonlinear mechanics of input and output variables and remedy the insufficiency of labeled samples. At last, the output prediction as well as the uncertainty of prediction can be obtained by the conditional distribution.

6 Claims, 10 Drawing Sheets

(56) References Cited

U.S. PATENT DOCUMENTS

| | | | |
|---|---|---|---|
| 2016/0160762 A1* | 6/2016 | Chandra | F01D 21/14 701/100 |
| 2018/0025288 A1* | 1/2018 | Piche | G06N 3/0472 706/46 |
| 2018/0082204 A1* | 3/2018 | Iwamasa | G05B 17/02 |
| 2019/0196425 A1* | 6/2019 | Cheng | G05B 17/02 |
| 2019/0339688 A1* | 11/2019 | Cella | G06K 9/6263 |
| 2019/0384255 A1* | 12/2019 | Krishnaswamy | G05B 13/026 |

* cited by examiner

SOFT SENSING OF A NONLINEAR AND MULTIMODE PROCESSES BASED ON SEMI-SUPERVISED WEIGHTED GAUSSIAN REGRESSION

FIELD OF THE INVENTION

Embodiments generally relate to sensors for industrial processes and, in particular, soft sensors for industrial process modeling, monitoring, and control. Exemplary soft sensors are usable for applications to nonlinear and multimode processes and employ semi-supervised weighted gaussian regression methods.

BACKGROUND

The strict requirements for process modeling, monitoring and control make online and accurate identification of key quality variables important in modern industry. However, in many industrial circumstances, it is extremely difficult to timely measure these key variables owing to reasons such as hostile site-on environment, high economy or analyzer cost, and large time delay. In order to overcome the shortcomings of traditional measurement technology, soft sensors, which are developed by modeling the regression relationship between output and input variables, have been widely used to predict the hard-to-measure quality variables through easy-to-measure process variables. As alternatives for hardware sensors, soft sensors have gained popularity because they are able to online measure the quality variables in a low cost and high efficiency way.

Generally speaking, soft sensor models fall into three categories, which are first-principle based, data-based, and hybrid models. Because of the high complexity of modern industrial processes, complete knowledge is difficult to obtain, which places restrictions on the use of first principle models, as well as the hybrid models. By contrast, data-based models can be conveniently built because a distributed control system can provide a vast volume of process data. Therefore, they have been more and more popular in both academia and industry. Many typical data-driven soft sensor approaches, including principal component regression, partial least squares, artificial neural network, support vector machine, and Gaussian process regression, have successful applications in industrial processes. The probabilistic density-based methods occupy an important position among them, because they consider the input and output variables as random variables and model them through probabilistic density or probabilistic distribution, which is a more reasonable way in handling noises and uncertainty issues compared with the deterministic methods.

It is important in a probabilistic distribution-based model to select a proper distribution to approximate a data structure. Among all probabilistic distributions, Gaussian is the most commonly used because of the central limit theory and its convenience for implementation. Although Gaussian achieves numerous successful applications, it may have some limitations when handling nonlinear and multimode characteristics along with a complex process mechanism, operating condition change, and feedstock switching.

Approaches dealing with nonlinearity and multimodality can be roughly categorized into two types: finite mixture model-based approaches and just in time learning (JITL)-based approaches. In the former, a training dataset is first partitioned into several sub-datasets via clustering methods such as k-means and Gaussian mixture model. Then the data samples falling into each sub-dataset are trained to build a sub-model, and the prediction results of each sub-model are combined to obtain the final prediction of quality variable. However, the finite mixture model-base approaches have some shortcomings in application. First, it is usually difficult to provide prior process information on the number of sub-datasets. Second, the prediction accuracy heavily depends on the result of clustering algorithms. Third, the computing burden and model complexity are huge especially when the number of sub-datasets is large.

In the JITL modeling framework, when a query sample is available, a local model is trained by using the most similar and relevant historical samples. Since the similar samples always share a homogeneous process mechanism, the local model can be more reasonable and accurate than the global model. Each local model is built uniquely and distinguished by the similarities between the query sample and each training sample, which makes JITL an effective tool in nonlinear and multimode process modeling. Its main advantage over a finite mixture model is that it relies on few underlying process knowledge. Thus it is more flexible and convenient in reality.

For a good visual presentation, FIGS. 10A-10C give a comparison of data description of a global model (FIG. 10A), finite mixture model (FIG. 10B), and JITL (FIG. 10C). The red line is the real function for data generation and the blue dots are samples collected in the historical dataset. The ellipses represent the estimated model of different methods. In particular, the left ellipse and right ellipse in FIG. 10C represent the estimated model around a query sample with a regular value, and a peak value, respectively.

Data-driven soft sensors are often based on complete data samples which contains both input and output variables. In practice, however, a vast number of training data samples are accessible while only a small portion of them are labeled, owing to the fact that output variables are often quality variables that are difficult to measure due to the highly expensive labeling cost of time, human efforts, and laboratory instruments. In traditional JITL models, only labeled data can be effectively utilized for local modeling, and a large number of unlabeled data samples are ignored and deleted. It is apparently inadvisable because without using unlabeled data samples, data information is not sufficiently exploited. Moreover, the developed soft sensor may not be guaranteed to provide reliable and accurate predictions, especially when the number of labeled data samples is quite small.

One exemplary application of soft sensors for industry is in fractionating columns. For instance, a debutanizer column is an important part of an industrial refinery and is used to split desulfuration and naphtha. The propane and butane in naphtha stream are removed through a debutanizer column process. For process safety and product quality the butane content in the debutanizer bottoms is desired to be minimized. For this purpose, its real-time measurement is of significance. However, it is difficult for traditional hardware sensors to timely measure the butane content, because gas chromatograph is not installed at the debutanizer bottom, but the overheads of the subsequent deisopentanizer column, which leads to a large measurement delay. A faster and more effective way of obtaining butane bottoms measurements is needed.

SUMMARY

To alleviate the soft sensor problem of imbalanced number of labeled and unlabeled data samples, exemplary embodiments herein present a novel Semi-supervised Weighted Gaussian regression (SWGR) model to describe a nonlinear and multimode data structure. Embodiments include SWGR based soft sensing methods.

According to an aspect of some embodiments, the joint probability density of both input and output variables p(x,y) is established point-wisely around a query sample, under a semi-supervised learning framework. This method is based on locally weighted learning, a typical method of JITL, which approximate a complicated nonlinear and multimode data structure by paying attention to the neighborhood points around a query sample.

According to another aspect of some embodiments, to overcome the adverse effect of measurement delay in a debutanizer column, a soft sensor is provided to estimate butane measurements in real time. For soft sensor construction, seven process variables are selected as input, which are top temperature, top pressure, reflux flow, flow to next process, sixth tray temperature, bottom temperature I and bottom temperature II.

According to a further aspect of some embodiments, the first step of a proposed SWGR model is to compute the distances between the query sample and each data sample in the historical training dataset, when the output prediction for the query sample is asked. After that, the distance-based weights are assigned to each historical sample. The weight is a decreasing function with distance, because the close data samples occupy a common mechanism, while the far away data samples are manipulated by distinct mechanisms. Then, a weighted Gaussian model around the query sample is constructed based on a local weighted log-likelihood function, which is able to capture the local data characteristics point-wisely with high accuracy. Labeled and unlabeled datasets are both incorporated for maximizing a weighted log-likelihood function to estimate the optimal parameter set.

SWGR is an effective tool for handling the imbalanced labeled and unlabeled sample problem. Accordingly, the complicated nonlinearity and multimodality around a query sample can be well handled with a few number of labeled samples. A target of a soft sensor model is to build a regression model between input and output variables. This can be achieved by calculating the condition distribution of output variables over input variables p(y|x) from the joint distribution p(x,y) which is estimated by the SWGR model based on the procedures described herein. As a probabilistic density-based algorithm, SWGR gives the distribution of output variable y, instead of a single point estimation for y in deterministic regression models. In density-based approaches, single point estimation can be easily obtained by taking expectation from the optimized probabilistic density. Usually, we consider the expectation of the optimized distribution as an output value, that is $\hat{y}=E(y|x)$. When a query sample $x_*$ comes, the output information can be obtained from the conditional distribution $p(y_*|x_*)$ by simply substituting $x_*$ for x. The advantage of a probabilistic distribution-based model is that it can easily handle a semi-supervised learning issue, as demonstrated in this disclosure. Another is that it is able to quantify the uncertainty of output prediction, which is helpful for ensemble learning and active learning.

Exemplary benefits of disclosed methods can be summarized as: i) proper for soft sensing of nonlinear and multimode processes; ii) reliance on only limited a priori process knowledge; and iii) the training process of maximizing a weighted log-likelihood function uses both labeled and unlabeled data samples for better accuracy of the resulting model.

A local weighted model is useful to deal with the nonlinear and multimode characteristic in industrial processes. However, its prediction performance may deteriorate when the number of labeled data samples is quite small. In order to alleviate such drawbacks in soft sensing application with limited labeled data samples, this disclosure proposes a novel SWGR method. By considering the data relationships between the training samples and a query sample, a local weighted Gaussian probabilistic density is built. The parameters may be obtained through constructing and maximizing the weighted log-likelihood function, where both labeled and unlabeled data samples are taken into account. SWGR can approximate nonlinear and multimode data structures around a query sample by estimating a local joint Gaussian distribution point-wisely, when only a few labeled data samples are available. Based on the joint Gaussian distribution, the conditional distribution of output over input is obtained, and accordingly a prediction for the query sample is made. Two case studies are carried out and comparative results demonstrate its superiority over other methods.

DETAILED DESCRIPTION

Figure 1A:
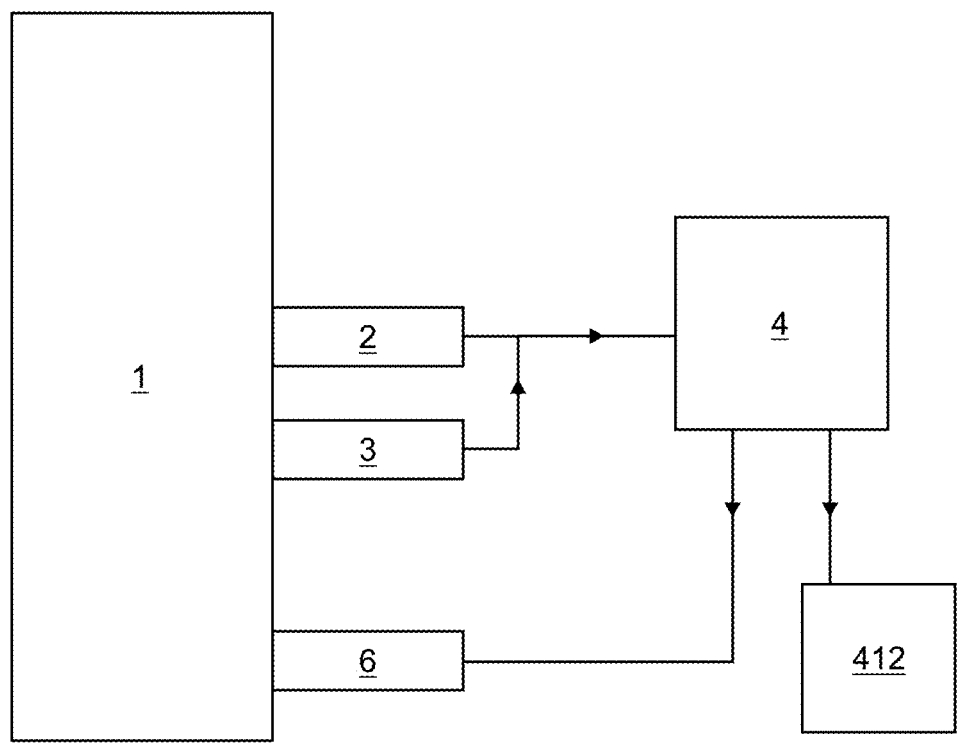
FIG. 1A is a block diagram showing an apparatus of a process plant for an industrial process together with a corresponding system for soft sensors and process control.

FIG. 1A shows an apparatus 1 of a process plant for an industrial process. One non-limiting example of an apparatus 1 is a fractionating column, e.g., a debutanizer column. Another non-limiting example of an apparatus 1 is a concrete mixer. A plurality of real sensors 2 and 3 are arranged on, in, connected to, or otherwise in relation with the apparatus 1 to sense, detect, measure, assess, determine, or otherwise obtain information about the apparatus, or more specifically, contents of the apparatus. A non-limiting example of a sensor is a transducer that physically translates some real physical aspect of the sensor's environment (like temperature, weight (or more accurately a load force resulting from gravity), radiation level, viscosity, etc.) into an electronic signal that quantifies or otherwise characterizes the physical aspect. While FIG. 1A shows only two blocks for convenience of illustration, an industrial process may have any number of real sensors involved, be it one, a few, tens, hundreds, or thousands.

It goes without saying that some aspects of the physical world cannot be measured directly, either because the technology to do so simply does not exist, or because it is not practical or feasible. Soft sensors satisfy a need for certain kinds of information and decision making for industrial processes where true hardware sensors cannot serve. Soft sensors produce metrics and other data through inferential estimation. Soft sensors may be embodied by one or more processors, generally represented in FIG. 1A by block 4, executing predetermined instructions in one or more computers of a local and/or distributed network. The outputs of the soft sensors may be fed back to field devices 6 and/or to human machine interfaces (HMIs) 412. The field devices 6 may be, for example, valves, valve positioners, switches, transmitters and sensors (e.g., temperature, pressure, level and flow rate sensors), located within the process environment and generally perform physical or process control functions such as opening or closing valves, measuring process and/or environmental parameters such as temperature or pressure, or other actions, to control one or more processes executing within the process plant or system.

Figure 1B:
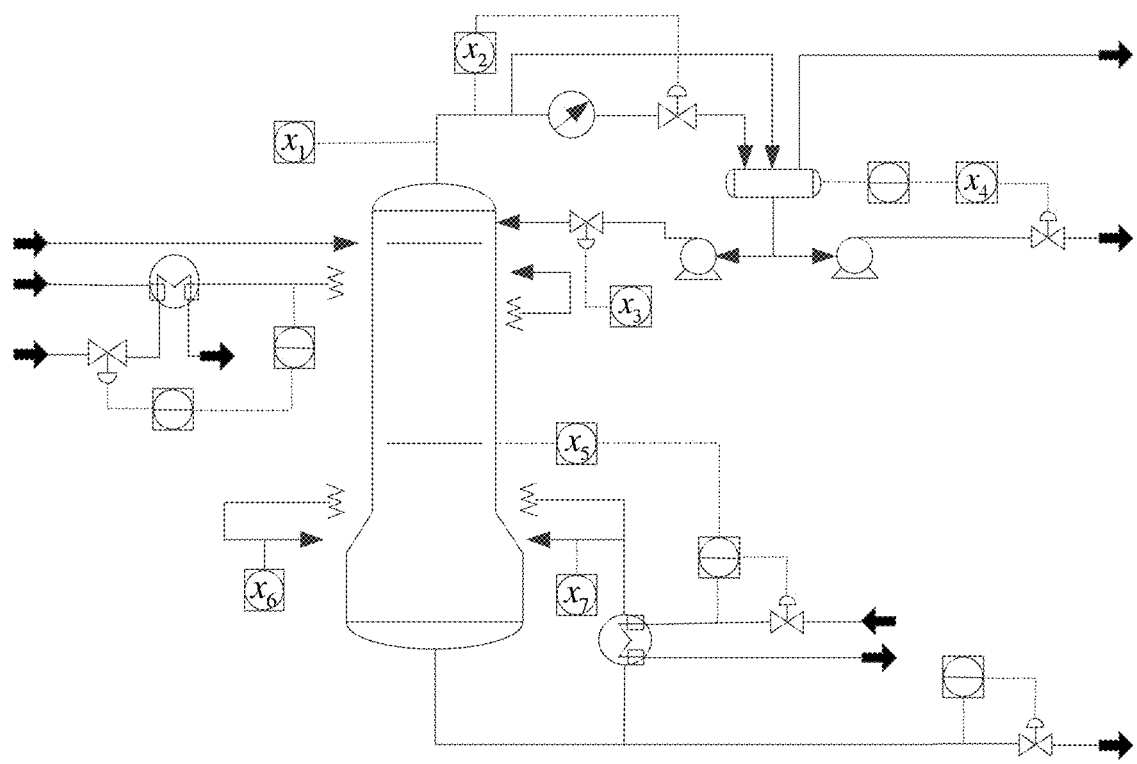
FIG. 1B is a schematic of a debutanizer column and supporting field devices.

FIG. 1B shows a more detailed schematic of a debutanizer column with standard symbols for field devices used in connection thereto.

In this disclosure, a data sample with both input and output information is denoted as "labeled" data, whereas a data sample that only incorporates input variables is denoted as "unlabeled" data. Modeling with both labeled and unlabeled data is termed as "semi-supervised" learning in a machine learning area.

Input variables usable for soft sensing are often easy-to-measure process variables such as temperatures and pressures. By contrast, the output variables of a soft sensor model may be quality variables that are much more difficult to measure due to, for example, the highly expensive labeling cost of time, human efforts, and laboratory instruments. As a result, in practice, a vast number of training data samples are accessible while only a small portion of them are labeled.

Figure 2:
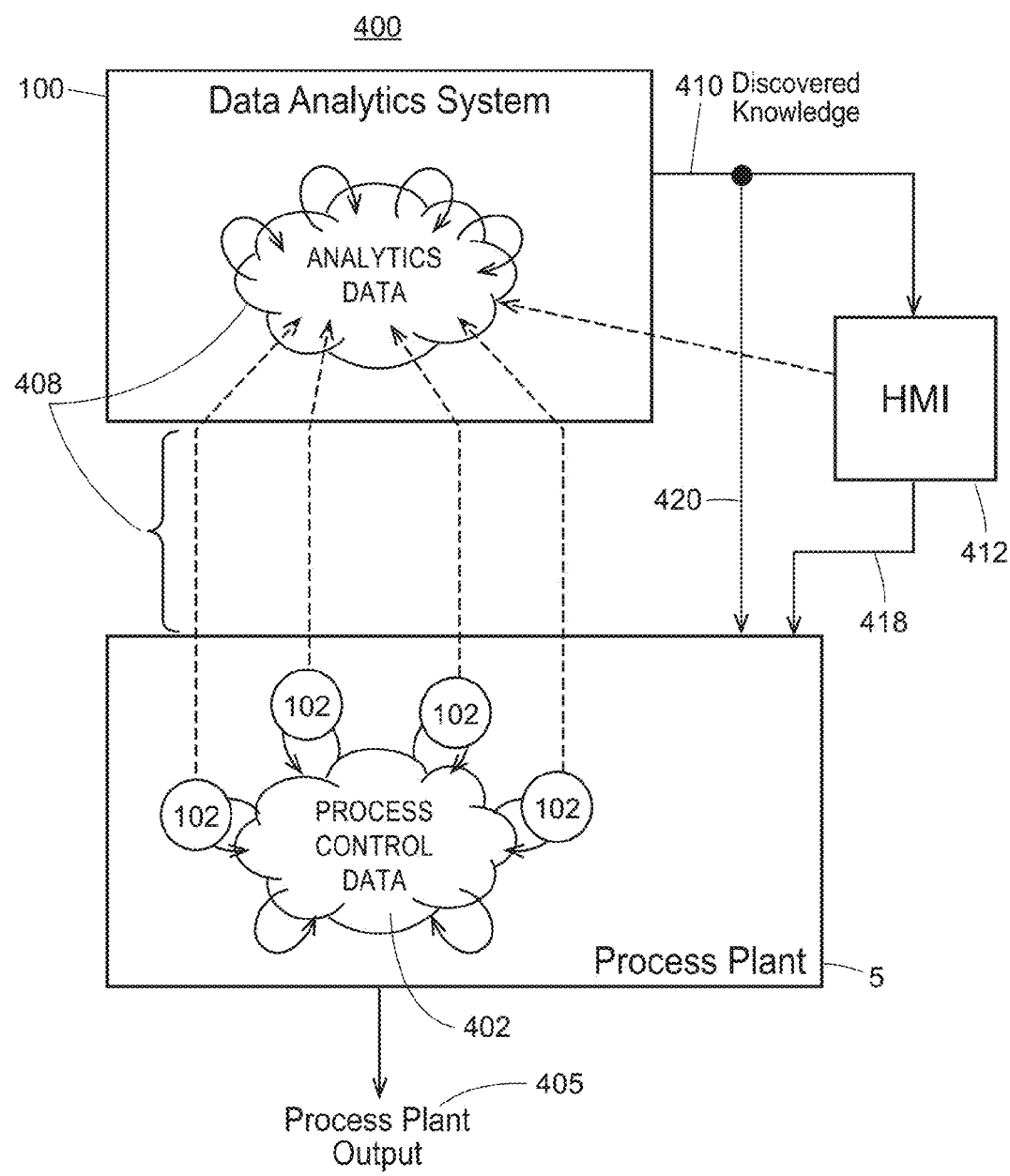
FIG. 2 depicts a high-level block diagram of a control loop that controls and optimizes process plant performance.

FIG. 2 illustrates an example high level block diagram 400 of a control loop that controls and optimizes the performance of a process plant 5. As shown in FIG. 2, the on-line process plant 5 generates, operates on, and communicates various types of control data 402 over traditional process control communication networks (e.g., network 10 discussed below) to control one or more industrial processes and generate process plant output 405. The distributed industrial process performance monitoring/analytics system 100 is connected to and integrated with the process plant 5 via embedded distributed data engines 102x (DDEs, discussed in more detail below) that capture analytics data 408 generated as a result of the process plant 5 controlling the one or more processes to produce the output 405. The captured analytics data 408 may include copies of first-order and higher-order process control data 402, as well as the results/output of analytics functions locally performed by the DDEs 102x and/or performed by off-line and on-line data analytics modules developed via the data analytics system 100. In some cases, the captured analytics data 408 includes new analytics functions that are generated via the data analytics system (DAS) 100 and/or that are autonomously generated by the DDEs 102x.

The process plant 5 may be a part of any of a number of different industries which have need or would benefit from soft sensing technologies according to this disclosure. One exemplary process plant 5 is a chemical production process plant. Operational variables may include but are not limited to temperature, pressure, and chemical content. Another exemplary process plant 5 is a wafer fabrication plant. Operational variables may include but are not limited to variables for film deposition, patterning, etching, polishing, and cleaning. A small sample of variables for these processes includes chamber temperature, localized temperature, pressure, RF power, gas flow, and flow temperature. Another exemplary process plant 5 is a wastewater processing plant. Operational variables may include but are not limited to substrate variables, physical and chemical variables, suspended solids (ss) variables, and biological activity variables. Examples of substrate variables are 5-day biochemical oxygen demand, total organic carbon, and total oxygen demand. Another exemplary process plant 5 is a large scale renewable energy production facility. A process plant 5 may monitor wind turbine fatigue, for example. Operational variables may include generator speed, generator acceleration, electrical power, pitch angle, tower top lateral acceleration, tower top longitudinal acceleration, wind direction, wind speed, and wave height. A process plant 5 may be a photovoltaic solar farm. Still another exemplary process plant 5 is a large-scale infrastructure monitoring system. Industries with which exemplary embodiments may be used include companies such as Baowu Steel Group; Sinopec Group; ExxonMobil; BASF SE; Petrochemical Industries Company; and Suez Environment.

The data analytics system (DAS) or platform 100 receives, generates, communicates, and operates on analytics data 408 to generate analytics output 410. The analytics output 410 may include discovered knowledge about the process plant 5, such as knowledge that is descriptive of the current operations of the process plant 5, knowledge that predicts occurrences of faults, failures, time intervals, performance, events, etc. given the current operations of the process plant 5, and/or knowledge that prescribes one or more prescriptive actions that may be taken to mitigate undesirable characteristics of current plant operations and/or to mitigate the probability of the occurrence of undesirable predicted faults, failures, time intervals, performance, events, etc. given the current operations of the process plant 5. In some embodiments, the discovered knowledge 410 includes knowledge about the analytics data 408 itself. For example, the discovered analytics knowledge 410 may include an optimal off-line data set that may be utilized to evaluate different off-line data modules, a series of steps that have been repeatedly used by data engineers and that are defined as a new data analytics user procedure, a new configuration of data blocks that are defined as a new data analytic technique, etc.

At least some of the discovered knowledge included in the analytics output 410 may be provided to a Human-Machine Interface (HMI) 412, such as a Data Analytics User Interface Application (discussed below). Via the HMI 412, a user may explore the discovered knowledge 410 generated by the data analytics system 100 with regard to the process plant 5. In some cases, the exploration of the discovered knowledge 410 includes the user utilizing the DAS 100 to create and execute additional data analytics modules to generate additional discovered knowledge 410 for additional exploration. At some point, based on the body of discovered knowledge 410, the user may make one or more changes 418 to one or more values, parameters, equipment, components, control loops, and/or other current operations of the on-line process plant 5, thereby optimizing the performance and output 405 of the process plant 5 and/or preventing or deterring the occurrence of faults, failures, and other undesirable conditions.

In some situations, at least some of discovered knowledge included in the analytics output 410 is directly provided to the process plant 5 to effect or implement one or more prescriptive changes, as represented in FIG. 2 by the arrow 420. For example, the discovered knowledge 410 may include a prescriptive action comprising a change to a set point, a change to a configuration of a controller, a change to a priority of process control message, or a change to some other value, parameter, configuration, etc. The data analytics system 100 may automatically and directly download or otherwise cause the change to be implemented in the process plant 5 without requiring any user intervention 418, thereby automatically optimizing the performance and output 405 of the process plant 5 and/or preventing or deterring the occurrence of faults, failures, and other undesirable conditions based on the discovered knowledge 410. It is noted that this leg of the control loop 400 automatically updates the on-line process plant 5 to improve its current operations in real-time, as the analytics system 100 processes current analytics data 408 and generates discovered knowledge 410 based on the current operations of the process plant 5. Thus, in contrast to existing analytics techniques that require hours or even days to calculate, determine, and implement prescriptive actions, the prescriptive actions generated by the analytics system 100 are optimized for the current operating conditions of the plant 5 and immediately applied to the process plant 5, and in some cases are applied even before any user is aware of an impending undesired or desired condition.

For optimum implementation of prescriptive actions within the process plant 5 as a whole, the control loop 400 may require both the autonomous leg 420 and the HMI control leg 418. For example, some prescriptive actions may require human intervention, such as installing a replacement valve, sensor, or other component.

To assist in the explanation of soft sensor development based on SWGR, it is first helpful to explain a weighted Gaussian model and a semi-supervised weighted Gaussian model. However, it is worth noting that due to a nonlinear and multimode data mechanism, Gaussian distribution is not applicable for most industrial cases.

Weighted Gaussian (WG) Model

Consider a training dataset $X \in R^{m \times n}$ and $y \in R^n$, where $X=\{x_i \in R^m\}_{i=1, 2, \ldots, n}$ is the input data samples with m dimensions, and $y=\{y_i \in R\}_{i=1, 2, \ldots, n}$ is the corresponding output data samples. The aim of a probabilistic density based model is to estimate an approximated joint density p(x,y) of input and output.

Denote the joint vector of input and output as Z=[X,y], whose ith sample is $z_i=[x_i^T, y_i^T]^T \in R^{m+1}$. For the sake of simplicity in expression, we denote q=m+1. The Gaussian distribution assumption is widely adopted in probabilistic modeling framework to describe a data characteristics. If a given dataset Z obeys an independent identical Gaussian distribution, its probabilistic density can be represented as:

$$p(Z \mid \mu, \Sigma) = \prod_{i=1}^{n} \frac{1}{\sqrt{(2\pi)^{q+1}|\Sigma|}} \exp\left(-\frac{1}{2}(z_i - \mu)^T \Sigma^{-1} (z_i - \mu)\right) \quad (1)$$

where $\mu$ and $\Sigma$ are mean vector and covariance matrix, respectively. A Gaussian distribution is determined by its mean and covariance. Usually, a maximum likelihood estimation approach is employed to obtain $\theta=(\mu,\Sigma)$, which is expressed as:

$$\theta = \operatorname*{argmax}_{\theta} \log p(Z \mid \theta) = \operatorname*{argmax}_{\theta} \sum_{i=1}^{n\Sigma_i} \log \quad (2)$$

However, due to a nonlinear and multimode data mechanism, Gaussian distribution is not applicable for most industrial cases. Compared with a single Gaussian model, a weighted Gaussian (WG) model is more suitable for industrial applications in reality. The difference between the two Gaussian density based methods is that former is a global method while latter is a local method.

To construct a local model around a query sample $x_*$, distance between each historical data sample $\{x_i, y_i\}_{i=1, 2, \ldots, n}$ and $x_*$ is first calculated. Usually, Euclidean distance is employed, $$d_i = \sqrt{(x_i - x_*)^T (x_i - x_*)} \quad (3)$$

According to (3), it can be seen that smaller distance means that the historical sample is closer to the query sample. Therefore, it is more relevant to the latter, and should be assigned a larger weight, and vice versa. As a result, the weight ought to be a decreasing function with distance. A widely used weight function is given:

$$w_i = \exp\left(-\frac{d_i^2}{\eta}\right) \quad (4)$$

where $\eta$ is a user-set parameter to adjust the decreasing rate. After the weights are calculated, a WG density around the query sample can be built. Denote $\theta_l=(\mu_l, \Sigma_l)$ as the parameters including mean and variance in the WG density. The joint distribution p(z) of input and output variables around the query sample, and the corresponding local weighted log-likelihood function $L(Z|\theta_l)$ of n historically observed data samples are given as:

$$p(z \mid \theta_l) = \frac{1}{\sqrt{(2\pi)^p |\Sigma_l|}} \exp\left(-\frac{1}{2}(z - \mu_l)^T \Sigma_l^{-1} (z - \mu_l)\right) \quad (5)$$

$$L(Z \mid \theta_l) = \sum_{i=1}^{n} w_i \log p(z_i \mid \theta_l) = \quad (6)$$

$$-\frac{1}{2} \sum_{i=1}^{n} w_i \left[ p \log(2\pi) + \log|\Sigma_l| + (z_i - \mu_l)^T \Sigma_l^{-1} (z_i - \mu_l) \right]$$

From (6), we find that when a sample is assigned with a large weight, it makes more contributions to the WG model around the query sample. That is because the close data samples intend to share homogeneous data characteristics with the query data.

$\theta_l$ can be calculated by maximizing the weighted log-likelihood function (6). This can be done by taking the partial derivatives of $L(Z|\theta_l)$ with respect to each parameter.

$$\frac{\partial L(Z|\theta_l)}{\partial \mu_l} = \sum_{i=1}^{n} w_i \left[ \sum_{l}^{-1} (z_i - \mu_l) \right] \quad (7)$$

$$\frac{\partial L(Z|\theta_l)}{\partial \sum_l} = \frac{1}{2} \sum_{i=1}^{n} w_i \left[ \sum_{l}^{-1} (z_i - \mu_l)^T (z_i - \mu_l) \sum_{l}^{-1} - \sum_{l}^{-1} \right] \quad (8)$$

By setting the above derivatives to zero, we can derive:

$$\mu_l = \frac{\sum_{i=1}^{n} w_i z_i}{\sum_{i=1}^{n} w_i} \quad (9)$$

$$\sum_l = \frac{\sum_{i=1}^{n} w_i (z_i - \mu_l)(z_i - \mu_l)^T}{\sum_{i=1}^{n} w_i} \quad (10)$$

Semi-Supervised Weighted Gaussian Model

Although a traditional supervised WG model is able to provide a good probability estimation for a nonlinear and multimode process, its performance may deteriorate a lot when only limited labeled samples are accessible. In such condition with a few labeled data only, a supervised modeling method fails to provide a reliable and satisfactory estimation result for the observed data. On the other hand, a vast amount of unlabeled data can be helpful to alleviate the drawbacks of supervised learning algorithms and enhance estimation performance. Thus, a semi-supervised learning algorithm for weighted Gaussian distribution is proposed in this disclosure.

A semi-supervised WG based regression (SWGR) method can be derived by calculating the condition distribution $p(y|x)$. As a semi-supervised learning approach, SWGR is able to incorporate both limited labeled data and large amount of unlabeled data in weighted Gaussian density estimation.

Consider labeled and unlabeled training datasets as $X^l = [x_1, x_2, \ldots, x_{n^l}] \in R^{n^l \times m}$, $y = [y_1, y_2, \ldots, y_{n^l}] \in R^{n^l}$ and $X^u = [x_{n^l+1}, x_{n^l+2}, \ldots, x_{n^l+n^u}] \in R^{n^u \times m}$. Usually, $n^u \gg n^l$ holds. Then the joint distribution of labeled and unlabeled data samples is:

$$p(X,y) = p(X^l,y)p(X^u) \quad (11)$$

To construct a local SWGR model around a query sample, we divide a joint vector into the input and output counterparts as well as mean vector and covariance matrix, i.e., $$z = \begin{pmatrix} x \\ y \end{pmatrix}, \mu_l = \begin{bmatrix} \mu_l^x \\ \mu_l^y \end{bmatrix}, \sum_l = \begin{bmatrix} \sum_l^{xx} & \sum_l^{xy} \\ \sum_l^{yx} & \sum_l^{yy} \end{bmatrix} \quad (12)$$

$$L(X, y|\theta_l) = L(X^l, y|\theta_l) + L(X^u|\theta_l) = \quad (13)$$
$$\frac{1}{2} \sum_{j=1}^{n^l} w_j \log p(x_j, y_j|\theta_l) + \sum_{i=n^l+1}^{n^u+n^l} w_i \log p(x_i|\theta_l) =$$
$$-\frac{1}{2} \sum_{j=1}^{n^l} w_j \left[ \log(2\pi) + \log\left|\sum_l\right| + (z_j - \mu_l)^T \sum_l^{-1} (z_j - \mu_l) \right] -$$
$$\frac{1}{2} \sum_{i=n^l+1}^{n^l+n^u} w_i \left[ \log(2\pi) + \log\left|\sum_l^{xx}\right| + (x_i - \mu_l^x)^T \left(\sum_l^{xx}\right)^{-1} (x_i - \mu_l^x) \right]$$

where $w_j$ and $w_i$ are the weights of the jth labeled sample and ith unlabeled sample with the parameter $\theta_l = (\mu_l^x, \mu_l^y, \Sigma_l^{xx}, \Sigma_l^{yy}, \Sigma_l^{xy}, \Sigma_l^{yx})$ to a query sample can be determined by maximizing the weighted log-likelihood function (13). This can be done by setting the partial derivatives of $L(X,y|\theta_l)$ with respect to each parameter to be zero, i.e., $$\frac{\partial L(X^l, y|\theta_l)}{\partial \mu} \frac{\partial \mu}{\partial \mu_x} + \frac{\partial L(X^u|\theta_l)}{\partial \mu_x} = 0 \Rightarrow \mu_x = \frac{\left[\sum_{j=1}^{n^l} w_j x_j + \sum_{i=n^l+1}^{n^l+n^u} w_i x_i\right]}{\left[\sum_{j=1}^{n^l} w_j + \sum_{i=n^l+1}^{n^l+n^u} w_i\right]} \quad (14)$$

$$\frac{\partial L(X^l, y|\theta_l)}{\partial \mu} \frac{\partial \mu}{\partial \mu_y} = 0 \Rightarrow \mu_y = \frac{\sum_{j=1}^{n^l} w_j y_j}{\sum_{j=1}^{n^l} w_j} \quad (15)$$

$$\frac{\partial L(X^l, y|\theta_l)}{\partial \sum} \frac{\partial \sum}{\partial \sum_{xx}} + \frac{\partial L(X^u|\theta_l)}{\partial \sum_{xx}} = \quad (16)$$
$$0 \Rightarrow \sum_{xx} = \left[\sum_{j=1}^{n^l} w_j (x_j - \mu_x)(x_j - \mu_x)^T + \sum_{i=n^l+1}^{n^l+n^u} w_i (x_i - \mu_x)(x_i - \mu_x)^T\right] \times \left[\sum_{j=1}^{n^l} w_j + \sum_{i=n^l+1}^{n^l+n^u} w_i\right]^{-1}$$

$$\frac{\partial L(X^l, y|\theta_l)}{\partial \sum} \frac{\partial \sum}{\partial \sum_{yy}} = 0 \Rightarrow \sum_{yy} = \frac{\sum_{j=1}^{n^l} w_j (y_j - \mu_y)(y_j - \mu_y)^T}{\sum_{j=1}^{n^l} w_j} \quad (17)$$

$$\frac{\partial L(X^l, y|\theta_l)}{\partial \sum} \frac{\partial \sum}{\partial \sum_{xy}} = 0 \Rightarrow \sum_{xy} = \frac{\sum_{j=1}^{n^l} w_j (x_j - \mu_x)(y_j - \mu_y)^T}{\sum_{j=1}^{n^l} w_j} \quad (18)$$

$$\frac{\partial L(X^l, y|\theta_l)}{\partial \sum} \frac{\partial \sum}{\partial \sum_{yx}} = 0 \Rightarrow \sum_{yx} = \frac{\sum_{j=1}^{n^l} w_j (y_j - \mu_y)(x_j - \mu_x)^T}{\sum_{j=1}^{n^l} w_j} \quad (19)$$

Since $\Sigma_l$ is symmetric, the divided parts $\Sigma_l^{xx}$ and $\Sigma_l^{yy}$ are both symmetric. Moreover, it is clear that $(\Sigma_l^{xy})^T = \Sigma_l^{yx}$.

Up to now, we have developed a SWGR model around a query sample. It can be seen from the above equations that the input-related parameters $\mu_l^x$ and $\Sigma_l^{xx}$ are updated by the input information of both labeled and unlabeled data. While the output-related parameters are only updated by the output information of the labeled dataset, because there is no output information for the unlabeled data. In addition, we can find that the counterparts of optimal parameters $\mu_l$ and $\Sigma_l$ are weighted averages of sample mean and sample covariance other than standard form of mean and covariance. This is why a local weighted Gaussian model outperforms a global one in a nonlinear and multimode industrial process.

The computational complexity of WG density estimation is $O((n^l)^2)$, while that of SWG is $O((n^l)^2+(n^u)^2)$. It is clear that SWG is more time-consuming than WG, because vast unlabeled data samples are used in it. The extra time is employed for handling a large number of unlabeled samples. However, it can get a more accurate estimation of parameters than WG. For soft sensor development, the task is to obtain reliable identification of quality variables. Gaining more accurate estimation is more significant than saving computer processing time in some contexts.

Soft Sensor Development Based on SWGR

Based on the developed SWGR model, the local Gaussian density around a query sample can be well estimated. Furthermore, a regression model can be built for online soft sensing of quality variables in industrial processes. When a new query sample $x_*$ comes, the first step is to calculate its distance-based weights with each sample in labeled dataset and unlabeled dataset. Then the corresponding parameters $\theta_l$ in the local model $p(x,y)$ around the query sample can be estimated. Finally the conditional distribution $p(y|x)$ can be obtained, and we take the mean of $p(y|x)$ as the prediction for the query sample.

According to (13)-(19), the joint probabilistic density of $\{x,y\}$, calculated by historical labeled and unlabeled datasets, can be expressed as $p(x,y)=N(x,y|\theta_l)$. There is a noteworthy property of multivariate Gaussian distribution that the conditional distribution of a jointly Gaussian distribution is also Gaussian. Based on this property, the conditional distribution $p(y|x)$ is also Gaussian:

$$p(y|x) = \frac{p(y,x)}{p(x)} = \frac{p(y,x)}{\int_x p(y,x)} = N\left(y \mid \mu^{y|x}, \sum\nolimits^{y|x}\right) \quad (20)$$

Instead of calculating this normalization explicitly, the conditional distribution can also be calculated more efficiently by considering the quadratic form in the exponent of Gaussian distribution, while the x terms are seen as constants for reinstating a normalization coefficient.

For convenience, a covariance matrix is presented in the inverse form, which is known as a precision matrix:

$$\Lambda = \begin{bmatrix} \Lambda_l^{xx} & \Lambda_l^{xy} \\ \Lambda_l^{yx} & \Lambda_l^{yy} \end{bmatrix} = \begin{bmatrix} \sum_l^{xx} & \sum_l^{xy} \\ \sum_l^{yx} & \sum_l^{yy} \end{bmatrix}^{-1} \quad (21)$$

Then we can obtain the quadratic term in the exponent $$(z-\mu_l)^T \sum\nolimits_l^{-1} (z-\mu_l) = \begin{bmatrix} x-\mu_l^x \\ y-\mu_l^y \end{bmatrix}^T \begin{bmatrix} \sum_l^{xx} & \sum_l^{xy} \\ \sum_l^{yx} & \sum_l^{yy} \end{bmatrix}^{-1} \begin{bmatrix} x-\mu_w^x \\ y-\mu_w^y \end{bmatrix} = \quad (22)$$

$$(x-\mu_l^x)^T \Lambda^{xx}(x-\mu_l^x) + (x-\mu_l^x)^T \Lambda^{xy}(y-\mu_l^y) +$$
$$(y-\mu_l^y)^T \Lambda^{yx}(x-\mu_l^x) + (y-\mu_l^y)^T \Lambda^{yy}(y-\mu_l^y)$$

Noting that the exponent in a general Gaussian distribution $N(t|\mu,\Sigma)$ can be written as:

$$(t-\mu)^T \Sigma^{-1}(t-\mu) = -t^T \Sigma^{-1} t + 2t^T \Sigma^{-1} \mu + C_1 \quad (23)$$

where $C_1$ includes terms independent of t.

If we rearrange terms in (22), then we have $$(z-\mu_l)^T \Sigma_l^{-1}(z-\mu_l) = -y^T \Lambda^{yy} y + 2y^T (\Lambda^{yy} \mu_l^y - \Lambda^{yx}(x-\mu_l^x)) + C_2 \quad (24)$$

where $C_2$ includes terms independent of y.

The covariance matrix and mean vector are given as $$\Sigma^{y|x} = (\Lambda^{yy})^{-1} \quad (25)$$

$$\mu^{y|x} = \Sigma^{y|x}\{\Lambda^{yy}\mu_l^y - \Lambda^{yx}(x-\mu_l^x)\} = \mu_l^y - (\Lambda^{yy})^{-1}\Lambda^{yx}(x-\mu_l^x) \quad (26)$$

where $\Lambda^{yy}$ and $\Lambda^{yx}$ can be calculated with the properties of an inverse matrix [48], i.e., $$\Lambda^{yy} = (\Sigma^{yy} - \Sigma^{yx}(\Sigma^{xx})^{-1}\Sigma^{xy})^{-1} \quad (27)$$

$$\Lambda^{yx} = -(\Sigma^{yy} - \Sigma^{yx}(\Sigma^{xx})^{-1}\Sigma^{xy})^{-1}\Sigma^{yx}(\Sigma^{xx})^{-1} \quad (28)$$

At last, we can obtain the conditional mean and covariance as:

$$\mu^{y|x} = \mu_l^y + \Sigma_l^{yx}(\Sigma_l^{xx})^{-1}(x-\mu_l^x) \quad (29)$$

$$\Sigma^{x|y} = \Sigma_l^{yy} - \Sigma_l^{yx}(\Sigma_l^{xx})^{-1}\Sigma_l^{xy} \quad (30)$$

In the above analysis, we can find that the conditional distribution of output variables over input ones for a query sample obeys Gaussian distribution parameterized by mean and covariance which can be calculated via (29)-(30). Thus, the desired conditional probabilistic distribution of a query sample can be represented as $p(y_*|x_*)=N(y_*|\mu^{y|x},\Sigma^{x|y})$, by simply substituting $x_*$ for x.

Then, the value and uncertainty of predicted output for the query sample can be given as:

$$\hat{y}_* = \mu^{y|x} \quad (31)$$

$$\tilde{y}_* = \Sigma^{y|x} \quad (32)$$

The step-by-step procedures of an SWGR soft sensing approach may be summarized as follows:

1) Collect the training data samples to form the labeled dataset $\{x_j^l, y_j^l\}_{j=1, 2, \ldots, n^l}$ and unlabeled dataset $\{x_i^u\}_{i=1, 2, \ldots, n^u}$.
2) Assign the distance-based weights to both labeled and unlabeled data samples, when a query sample comes with (3) and (4).
3) Construct the weighted log-likelihood function $L(X^l, X^u, y|\theta_l)$, and maximize it for optimal parameters with (14)-(19).
4) Calculate the conditional distribution $p(y|x)$ based on the joint Gaussian density $p(x,y)$. Substitute $x_*$ for x in $p(y|x)$ to get $p(y_*|x_*)=N(y_*|\mu^{y|x},\Sigma^{y|x})$.
5) Use (31) and (32) to obtain predicted value and uncertainty of the query sample.

An embodiment may be a process control system, which may be distributed. Process control systems are employed or employable in chemical, petroleum, industrial or other process plants to manufacture, refine, transform, generate, or produce physical materials or products. A process control system typically includes one or more process controllers communicatively coupled to one or more field devices via analog, digital or combined analog/digital buses, or via a wireless communication link or network. The field devices, which may be, for example, valves, valve positioners, switches, transmitters and sensors (e.g., temperature, pressure, level and flow rate sensors), are located within the process environment and generally perform physical or process control functions such as opening or closing valves, measuring process and/or environmental parameters such as temperature or pressure, or other actions, to control one or more processes executing within the process plant or system. Smart field devices, such as the field devices conforming to the well-known Fieldbus protocol may also perform control calculations, alarming functions, and other control functions commonly implemented within the controller.

The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant, e.g., to control at least a portion of one or more industrial processes running or executing within the plant. For example, the controllers and the field devices control at least a portion of a process being controlled by the process control system of the process plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices may be centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

Figure 3:
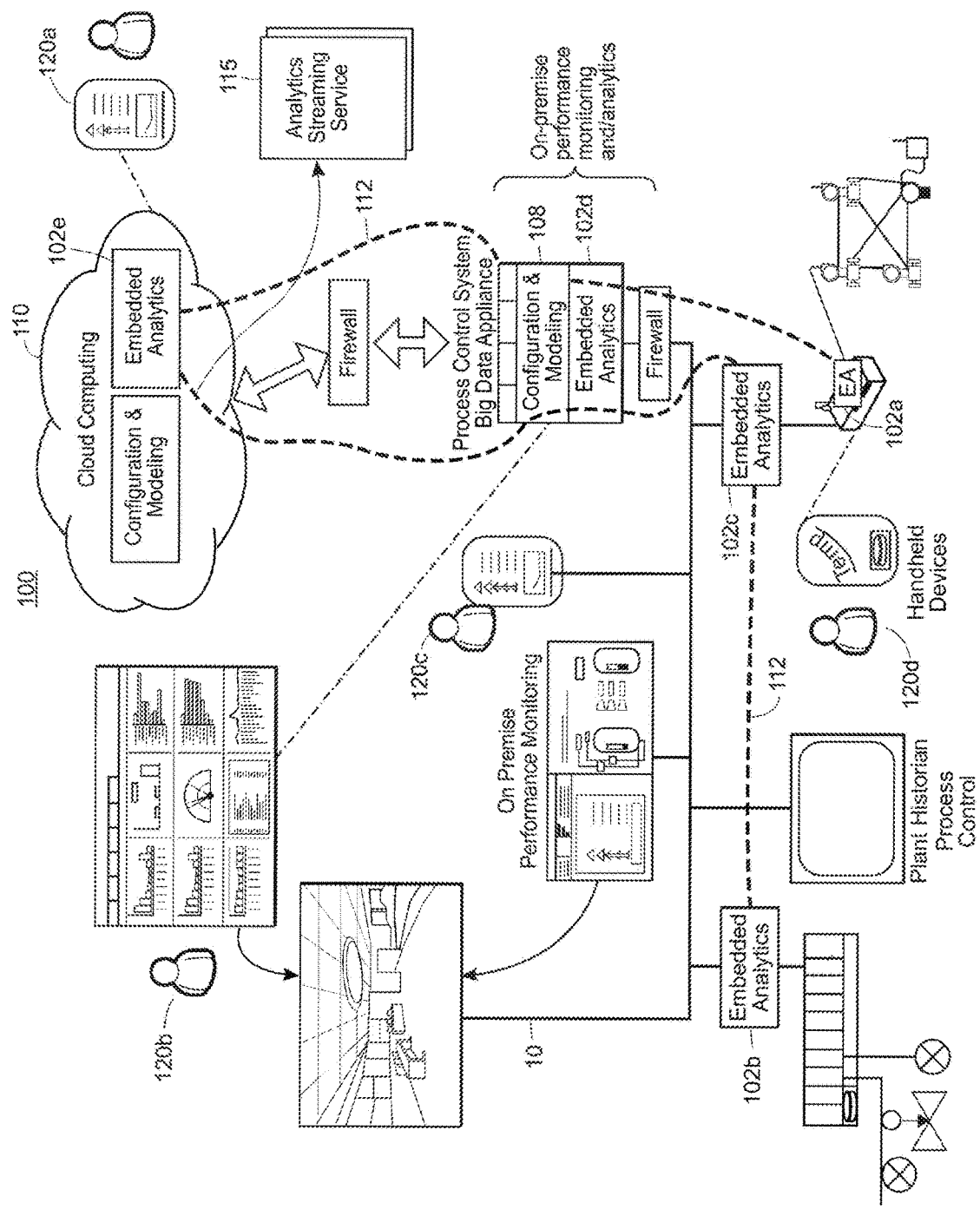
FIG. 3 depicts a block diagram of an example system for distributed industrial process performance monitoring/analytics.

FIG. 3 includes a block diagram of an example system 100 for distributed industrial process performance monitoring/analytics, which is also referred to interchangeably herein as a data analytics system (DAS). The DAS 100 or at least a portion of the DAS 100 may operate in conjunction with, for example, a process plant, process plants and/or process control systems.

Generally, the DAS 100 may support localized performance monitoring and/or analytics while simultaneously supporting large-scale (e.g., system-wide and/or across multiple devices or nodes of a process plant) performance monitoring, data mining, and data analytics for process plant environments. To this end, the system 100 includes a plurality of distributed data engines (DDEs), examples of which are indicated in FIG. 3 by the reference numbers 102a-102e. As used herein, the reference number "102x" refers to any one or more of the DDEs 102a-102e. The data engine 102a of FIG. 3 may be included in a wireless gateway. The data engine 102b of FIG. 3 may be embedded in a controller. A distributed data engine 102c is connected to the data highway 10. A distributed data engine 102d is embedded in a centralized big data appliance 108 of a process plant. Distributed data engine 102e is embedded in a big data cloud node 110, where the big data cloud node 110 may service the data analytics needs of the process control plant (and in some configurations, may also service other process control plants). Of course, the system 100 is not limited to only five data engines 102a-102e, but may include any number of distributed data engines, at least some of which are embedded in or manufactured into their respective data sources (e.g., into respective process control devices of the process plant) and/or at least some of which are otherwise connected to some other data source (e.g., component, portion, etc.) of the process plant.

The data analytics system or DAS 100 may include one or more user interface applications via which data-related human-machine interactions are conducted. The presence of example instances of these user applications is depicted in FIG. 3 by references 120a-120d. A user interface application for industrial performance monitoring/analytics may be provided by or operate in conjunction with a process plant or system or an industrial performance monitoring/analytics system 100 of FIG. 3, for example. However, the user interface application for industrial performance monitoring/analytics described herein may be provided by or operate in conjunction with other industrial performance monitoring and analytics systems for process control systems. For ease of discussion, though, the industrial performance monitoring/analytics user interface application is discussed below with reference to FIG. 3. Additionally, for ease of reading, the Industrial Performance Monitoring/Analytics User Interface Application is referred to herein using capitalization to distinguish from general-purpose and/or other user interface applications, and is also interchangeably referred to herein as the "Data Analytics User Application," the "Data Analytics User Interface Application," the "Data Analytics Application," the "DDE User Interface Application," or the "User Interface Application."

The DDE User Interface Application provides an interface for a user to interact with the distributed industrial process performance monitoring/analytics system or DAS 100 to define structure, query data, build, and evaluate draft data models. When the draft data models are finalized, the DDE User Interface Application allows the data models to be downloaded into a runtime engine and deployed to operate in conjunction with an on-line process control system. A deployed data model (also referred to as an executing or on-line data module) may be accessed and monitored via a runtime dashboard of the DDE User Interface Application. The DDE User Interface Application is also able to generate alarms and notifications that correspond to executing data models.

The DDE User Interface Application enables a user to create, view, and modify data models, each of which defines one or more data analytics (e.g., descriptive, predictive, and/or prescriptive analytics) that are to be executed or performed on an input data set. Data models may be drafted or created in an off-line mode (e.g., while the data model is disconnected from live data sources in an on-line or operating process control system), and in this mode a data model is referred to herein as an "off-line data module."

The DDE User Interface Application also enables a user to transform an off-line data module into an "on-line data module," so that the on-line data module of the data model binds to or otherwise receives live (e.g., streaming) data being generated by live data sources of the on-line process control system, performs the one or more data analytics defined therein on the live data, and provides the output to a user interface, historian, or other applications. For example, the output data generated by a data model may include descriptive, predictive, and/or prescriptive information or data corresponding to the process plant and/or a process being controlled therein.

In a particular embodiment, the on-line data module of the data model receives and operates at least in part on continuous, real-time data that is generated by devices or components of the process plant as a result of on-going control of an on-line process executing in the plant. For example, the on-line data module operates on continuous, real-time time-series data generated by the on-line process plant and/or by a process control system included in the plant while the process plant and the process control system are operating to control the process. The data model continually operates on the continuous, real-time data stream, (e.g., by performing its one or more data analytics functions and other functions (if any) thereon as defined by the data model), and continuously generates a real-time stream of results or output data, which may be displayed at a user interface (e.g., as a rolling line graph or other depiction) and may continually reflect the current, real-time values of the output of the data model. In an example, the data output generated by the data model and displayed at the user interface includes at least one predictive value and its variation over time. Generally, though, data models are capable of operating on large quantities of data generated by a variety of data sources within the process control plant or environment for the purposes of fault detection, prediction, and prescription for the process control plant or environment.

In an embodiment, the DDE User Interface Application is web-based and is accessed through a web browser, so that different instances of the Application can be used by various platforms (e.g., Apple Macintosh, Linux, Windows, etc.) and by various users at various computing devices, sometimes simultaneously. However, the DDE User Interface Application is not limited to a web-based implementation, and may utilize any other suitable implementation that is platform-independent and that can be extended to multiple users and/or instances simultaneously.

Further, although the DDE User Interface Application is described herein as applying to a single process control plant or environment with multiple instances of the DDE User Interface Application executing simultaneously, this configuration is illustrative only and is not meant to be limiting. For example, in some configurations, a DDE User Interface Application may be applied to multiple process control plants or environments that operate independently in different locations and on different processes. For instance, a single DDE User Interface Application provided by a bank of servers or computers may be utilized by multiple oil refineries of a petroleum company so that some instances of the DDE User Interface Application execute at Refinery A and some instances execute at Refinery B.

An on-line data module may operate on real-time, on-line, or streamed, live data that is being generated due to the real-time operations of a process control environment or plant. For example, an executing or deployed on-line data module or data model may continuously operate on real-time data that is continuously being generated due to the on-line operations of the process plant, and the on-line data module or model may itself continuously generate real-time output data or results of its execution, which may be displayed and continuously updated on a user interface. The on-line execution or operation of the deployed, on-line data module and corresponding results may be monitored at a Dashboard of the DDE User Interface Application.

Within the DDE User Interface Application, data blocks, data modules (whether on-line or off-line), and portions thereof may be visually and/or graphically represented to a user as diagrams or data diagrams on a workspace or canvas provided by the DDE User Interface Application. Generally, each data diagram may include a set of data blocks (e.g., which may be represented by two-dimensional shapes) that are interconnected by a set of wires (e.g., which may be represented by lines).

The distributed industrial process performance monitoring and/or analytics system or DAS 100 provides a platform that supports data analytics configuration, data modeling, data model execution, data visualizations, and streaming services for industrial process plants. Although various nodes of the monitoring and analytics system 100 may be embedded within a process control system or plant, the data communications network 112 of the analytics platform 100 may exist outside of (and be independent of) other systems of the process plant. The architecture of the data analytics system 100 allows the data analytics system 100 to be easily added or integrated into existing, legacy process plants.

Knowledge about a process plant that is discovered by the data analytics system 100 may be utilized to modify parameters, equipment, operations, and other portions of the process plant to increase the performance of the plant and decrease the occurrence of faults, failures, and other undesirable conditions. Advantageously, the data analytics system 100 may discover knowledge about the process plant in real-time in correspondence with the current, on-line operations of the process plant, so that the discovered knowledge is descriptive, predictive, and/or prescriptive of the current operations of the process plant. As such, the data analytics system 100 and the process plant form a control loop to control and optimize the performance of the process plant.

Figure 4:
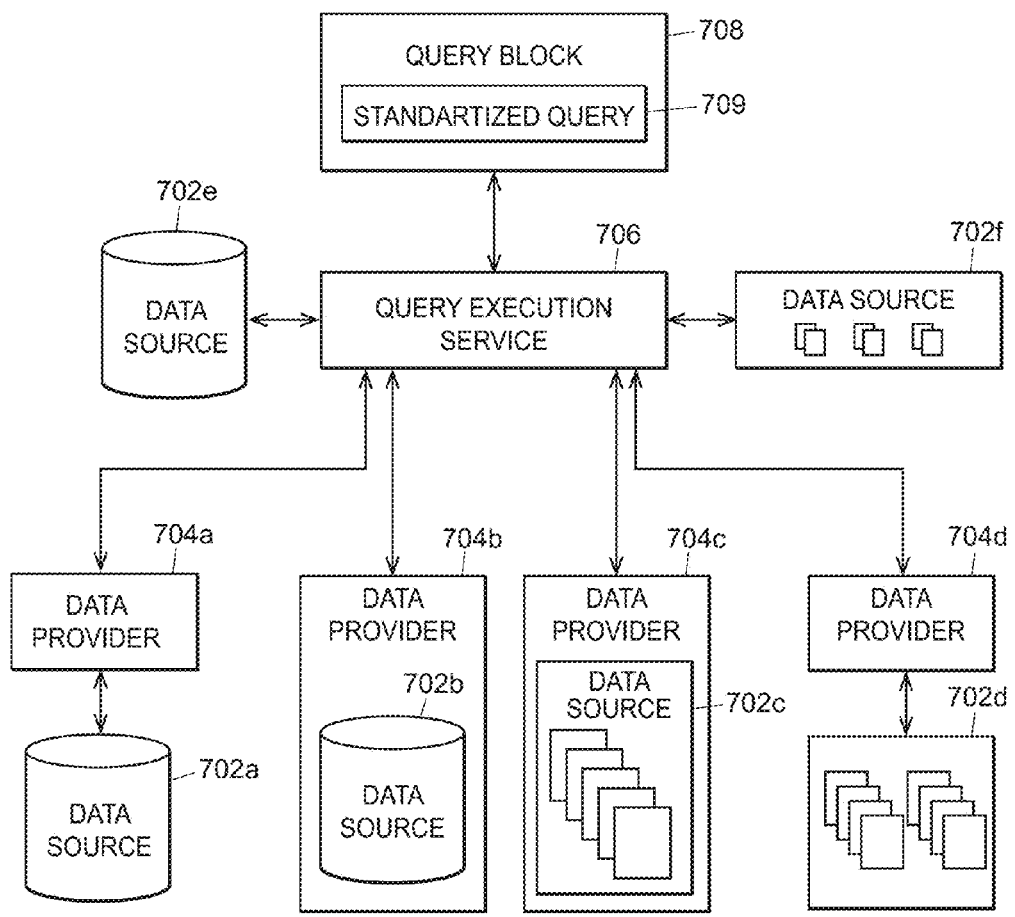
FIG. 4 depicts a block diagram of an example analytical query system.

FIG. 4 illustrates a block diagram showing various data sources 702*a*-702*f* and data providers 704*a*-704*d* communicatively connected to a query block 708 of a DDE User Interface Application via a query execution service 706. Each of the data sources 702*a*-702*f* is an electronic data source, storing data in a computer-readable format. Some data sources 702*e* and 702*f* may interface with the query execution service 706 without an intervening data provider 704, such as through an internal or network data connection. Other data sources 702*a*-702*d* interface with the query execution service 706 via one or more data source provider 704*a*-704*d*. The data providers 704*a*-704*d* may be configured to access, search, sort, read, and/or write data to or from the respective data sources 702*a*-702*d*. In some embodiments, the data providers 704*a*-704*d* may receive data source-specific queries that utilize the respective data source-specific query formats of the data sources 702*a*-702*d*. In other embodiments, the data source providers 704a-704d may be configured to receive a standardized query 709 using a customized query language from the query block 708 and convert the standardized query into a respective data source-specific query format utilizing the particular query mechanisms of the target data sources 702a-702d. The data providers 704 a-704 d or the data sources 702 e-702 f may include an execution engine (not shown) that processes and executes data source-specific queries for a specific data source 702. The execution engine may be part of the data source 702 itself, or it may be part of the data provider 704 associated with the data source 702 (e.g., the data provider 704 b associated with data source 702 b). Each data source 702 may be a database or document store, such as a document store including a plurality of JavaScript Object Notation (JSON) files containing data. In some embodiments, the data sources 702 a-702 f may even include live data sources, such as data streams generated by field devices of a process plant 5. Such live data sources may be queried by parsing data obtained and retaining or extracting only the portion of the data specifically requested.

Embodiments may be a system, a method, and/or a computer program product. The computer program product may include a computer readable storage medium (or media) having computer readable program instructions thereon for causing a processor to carry out aspects of the processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Example 1. Debutanizer Column Process

The objective of this Example is to estimate the butane content in a debutanizer bottom where timely real-time measurement is not feasible. As soft sensor input, seven process variables are selected: top temperature, top pressure, reflux flow, flow to next process, sixth tray temperature, bottom temperature I and bottom temperature II.

A total of 2000 samples were collected, which are divided into two parts: i) a training dataset with 1000 samples; and ii) a testing dataset with the remaining 1000 samples. In order to simulate the situation of imbalanced labeled and unlabeled datasets, the training dataset is further partitioned into two parts. In the training dataset, only 10% samples are labeled while the other 90% data samples are unlabeled, which means the latter only have the values of the seven input variables.

Here, two density-based regression methods, namely WG regression (WGR) and SWGR, are mainly focused on prediction performance comparison given a limited number of labeled samples. Moreover, a popular soft sensing method, partial least square (PLS), was also constructed. In order to make it capable of semi-supervised learning, a self-training strategy is introduced. As a widely-used semi-supervised learning algorithm, self-training can enlarge a modeling space and improve prediction performance. Like SWGR, the self-training-based PLS (STPLS) incorporates both labeled and unlabeled samples for modeling to obtain an accurate prediction. Then, a total of 4 soft sensor models are constructed for comparison, including PLS, STPLS, WGR, and SWGR. To evaluate the performance of soft sensors, rooted mean square error (RMSE), correlation coefficient (COR), and maximum absolute error (MAE) indexes are utilized, which are defined as follows:

$$RMSE = \sqrt{\frac{(y-\hat{y})^T(y-\hat{y})}{n_t}} \quad (33)$$

$$COR = \frac{\text{cov}(\hat{y}, y)}{\text{var}(\hat{y})\text{var}(y)} \quad (34)$$

$$MAE = \max|y - \hat{y}| \quad (35)$$

where $y$ and $\hat{y}$ are the real and prediction vector of the testing output, respectively, and $n_t$ is testing sample count.

TABLE I

PREDICTION RESULTS FOR BUTANE CONTENT

| Method | PLS | STPLS | WGR | SWGR |
|---|---|---|---|---|
| RMSE | 0.1435 | 0.1397 | 0.1399 | 0.1319 |
| COR | 0.3992 | 0.4221 | 0.4689 | 0.5309 |
| MAE | 0.6881 | 0.7354 | 0.7481 | 0.6546 |

Figure 5A:
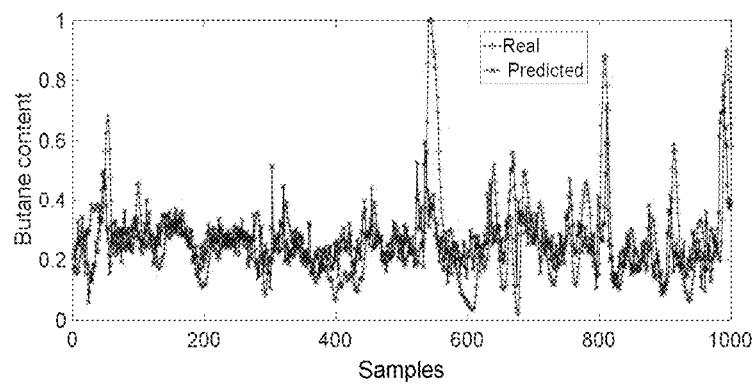
FIG. 5A is PLS prediction results of testing samples for a debutanizer column process.
Figure 5B:
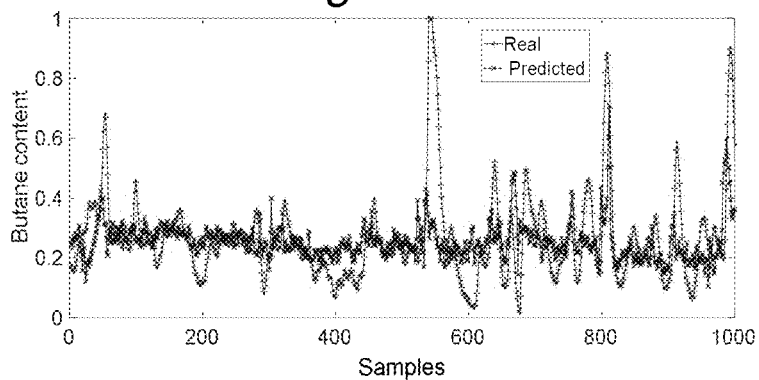
FIG. 5B is STPLS prediction results of testing samples for a debutanizer column process.
Figure 5C:
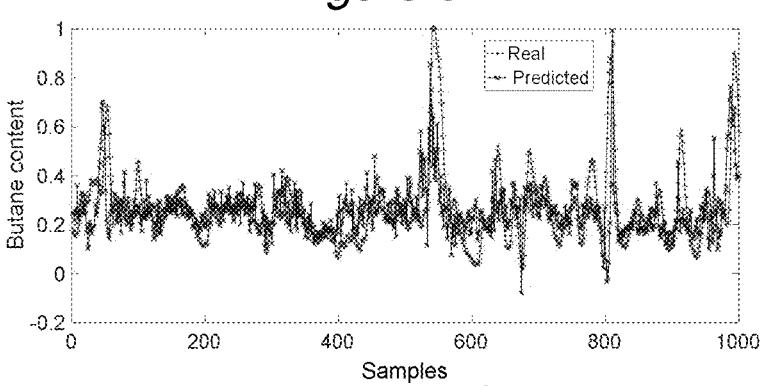
FIG. 5C is WGR prediction results of testing samples for a debutanizer column process.
Figure 5D:
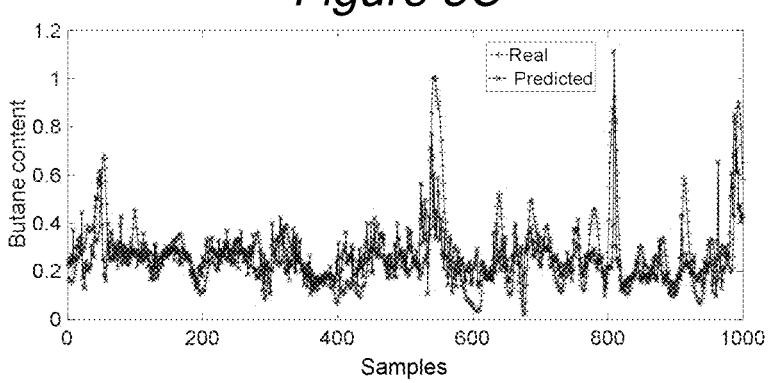
FIG. 5D is SWGR prediction results of testing samples for a debutanizer column process.

The prediction results with different models are tabulated in Table I, and the detailed information of each real and predicted data sample of a testing quality variable is shown in FIG. 5A (PLS), FIG. 5B (STPLS), FIG. 5C (WGR), and FIG. 5D (SWGR). Through the table and figures, it can be clearly seen that SWGR outperforms the three alternatives, since SWGR's performance indexes are all better than the indexes of all three alternatives. In the supervised scenario without unlabeled data, the traditional PLS gives a worse prediction performance than the JITL-based one, since a global model is not sufficient to approximate a nonlinear input-out-relationship. Obviously, the semi-supervised learning-based STPLS shows improvement over the supervised learning-based ones. This is because the modeling space has been enlarged with the incorporation of additional unlabeled data information, which is the same case of the proposed method. In STPLS, the missing output value is estimated via a nearest-neighborhoods pseudo-labeling method. The main drawback of the TSPLS is that the performance improvement heavily relies on the pseudo-labeled samples. It is difficult to guarantee the accuracy of the pseudo-labeled samples. The benefit of the proposed SWGR is that good care of nonlinearity and semi-supervision is taken by designing a weighted log-likelihood function which incorporates both labeled and unlabeled data. Therefore, SWGR is more flexible and more efficient for online identification of quality variables than STPLS, to a certain extent. A main difference between SWGR and WGR is the estimation of $\mu_i^x$ and $\Sigma_i^{xx}$. The $\mu_i^x$ estimation of SWGR and WGR at the 450th testing sample are [0.236, 0.662, 0.464, 0.501, 0.706, 0.740, 0.717] and [0.245, 0.663, 0.480, 0.510, 0.717, 0.741, 0.720], respectively. Because both labeled and unlabeled data are utilized for calculating $\mu_i^x$ and $\Sigma_i^{xx}$ in SWGR, while only labeled data are used in WGR, the estimation of input relevant parameters are more accurate to capture nonlinear and multimode data characteristics.

Monitoring peak values of butane content is an important industrial practice in a refinery process since failure to detect it may result in dangerous circumstances. As shown by FIG. 5, there are several peak values in a debutanizer column process. Generally speaking, the JITL based-soft sensors performs better than the global soft sensors in measuring peak values. This is because the data samples around the peak value points are mainly focused on larger weights when measuring peak values. Furthermore, an SWGR model is more preferable in coping with peak value than WGR since its tracking ability for the large values of quality variables is stronger, and prediction errors are also smaller.

Figure 6:
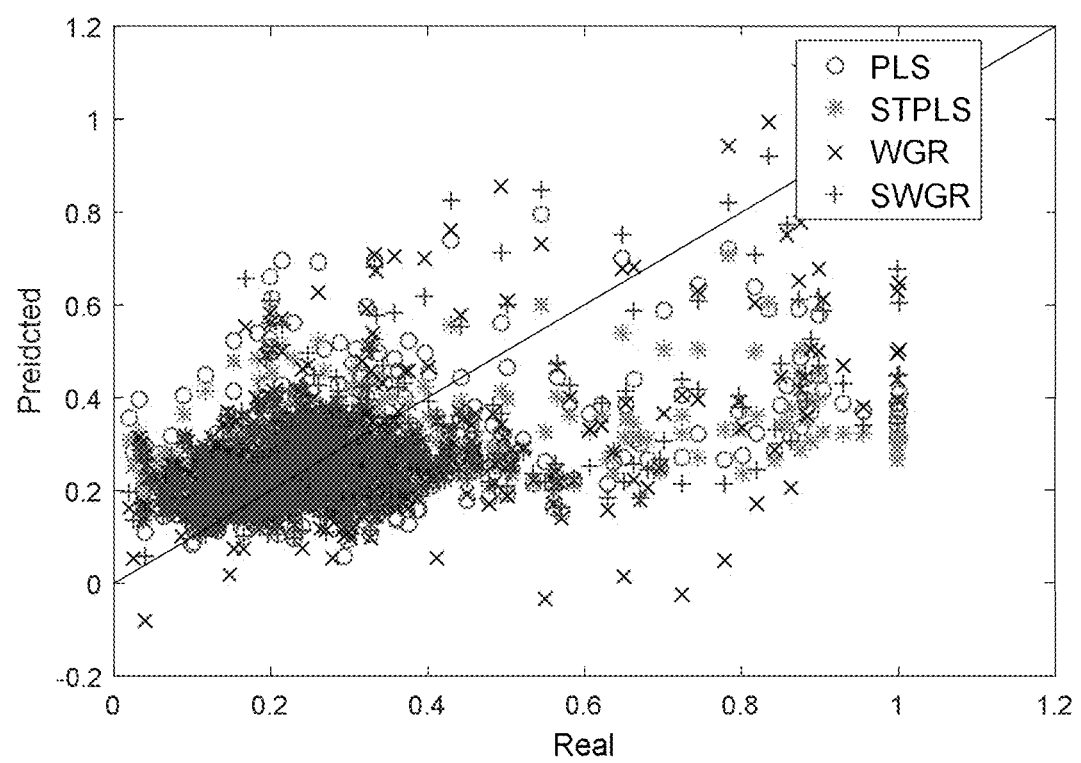
FIG. 6 is scatter plot comparisons for a debutanizer column process.

For intuitive comparison, a scatter plot comparison among the four soft sensing methods are provided in FIG. 6. It can be readily seen that distributions of scatters achieved by SWGR are more scattered in contrast to those by its three peers.

All of the comparison results illustrate the accurate and reliable soft sensing performance of the proposed SWGR, which verifies its effectiveness and flexibility in coping with the online measuring quality variable given a few labeled samples.

Example 2. Concrete Compressive Strength Experiment

The compressive strength of concrete is an important basis for the design and on-site implementation of a concrete structure. Usually, the compressive strength can be evaluated after the concrete materials have been maintained for at least 28 days. Therefore, the quality prediction is of significance for concrete mix proportions adjustment and concrete quality control. For estimation of the compressive strength in this concrete process, eight input process variables are chosen: cement, fly ash, slag, water, SPgate, coarse aggregate, fine aggregate, and age.

TABLE II

PREDICTION RESULTS FOR CONCRETE COMPRESSIVE STRENGTH

| Method | PLS | STPLS | WGR | SWG |
|---|---|---|---|---|
| RMSE | 11.7325 | 11.1659 | 10.0527 | 9.1807 |
| RRMSE | 0.5214 | 0.5485 | 0.4136 | 0.3645 |

A total of 1030 samples were collected, then partitioned into a training dataset containing 515 samples and a testing dataset with the remaining 515 samples. For the sake of simulating the case of limited number of labeled samples, only 10% labeled data samples are assumed. Again, PLS, STPLS, WGR and SWGR based soft sensors are built for comparison.

To evaluate the performance of soft sensors, the RMSE in (33), and the relative RMSE (RRMSE) indexes are used. We have:

$$RRMSE = \sqrt{\frac{\sum_{i=1}^{n_t}\left[\frac{y_i - \hat{y}_i}{y_i}\right]^2}{n_t}} \qquad (36)$$

where $y_i$ and $\hat{y}_i$ are the real and prediction values of the quality variables for each sample in the testing dataset, respectively, and $n_t$ represents the number of testing data samples.

Figure 7:
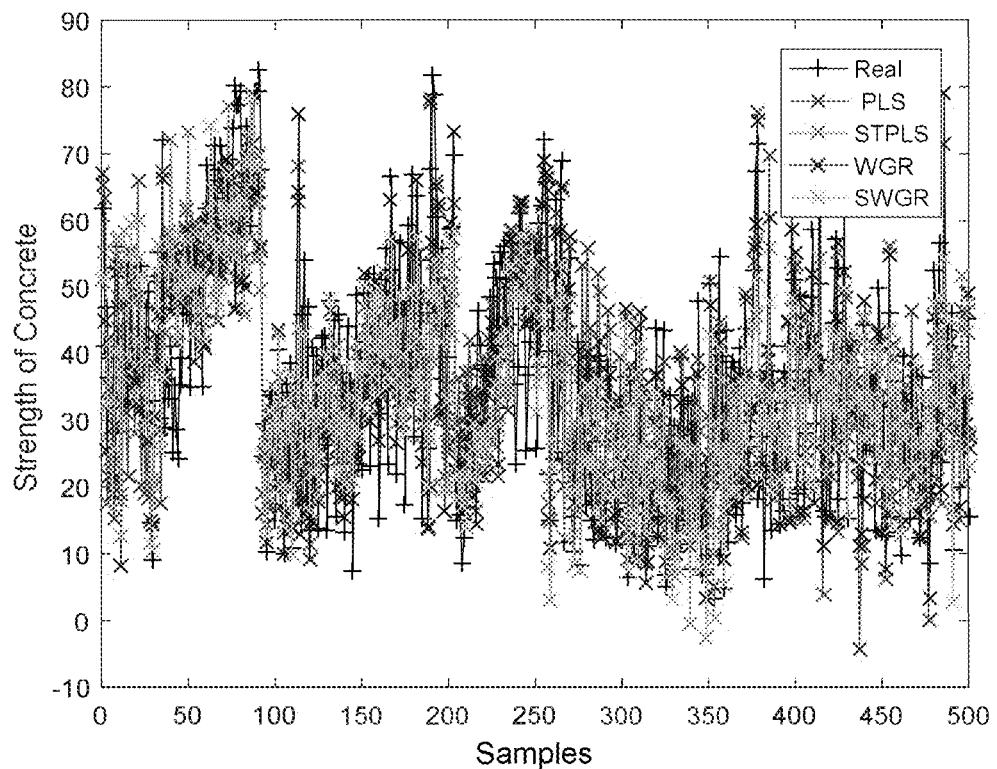
FIG. 7 is prediction results of the testing samples for concrete process.
Figure 8:
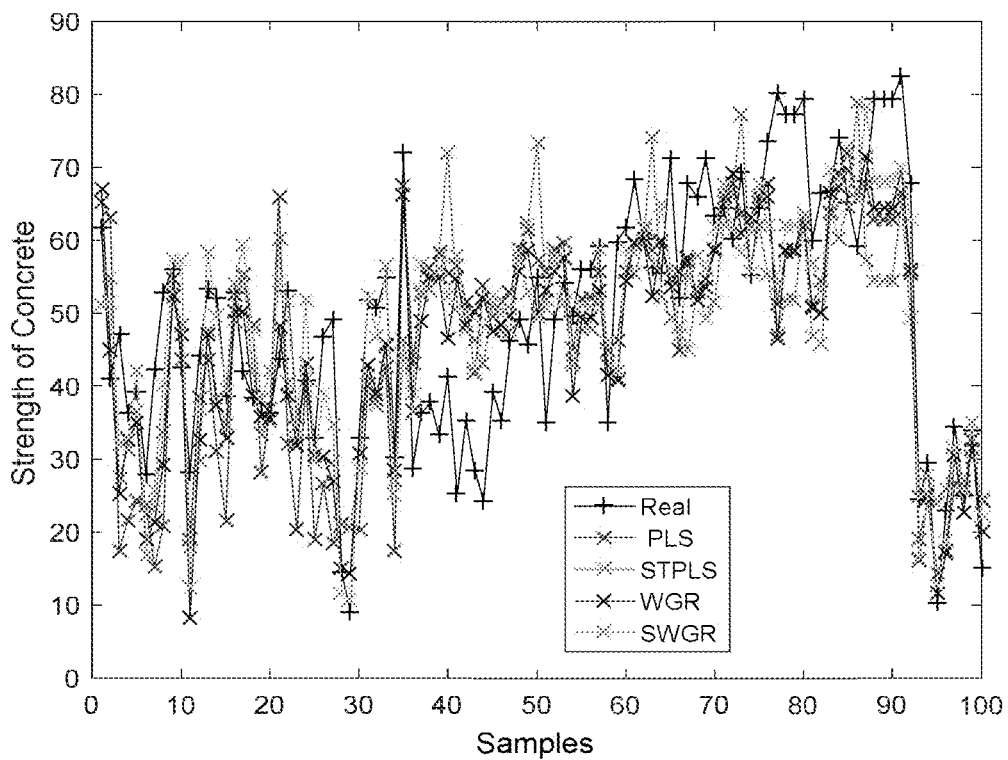
FIG. 8 is prediction results of the first 100 testing samples.

The prediction results of various soft sensors are tabulated in Table II, and the detailed information of each real and predicted data sample of the 1st-500th testing data is shown in FIG. 7. The concrete process clearly presents nonlinearity and multimodality. Particularly, the comparison information with different methods of the first 100 testing samples are provided in FIG. 8. The JITL learning based soft sensors performs much better than global model-based ones, because the data are under-fitted with a global model. Furthermore, WGR and SWGR are both local models, but the RMSE value of SWGR is smaller than WGR's. This is because only the labeled samples have been exploited for modeling and WGR totally ignores the information of unlabeled data. SWGR is more efficient in capturing the data characteristics than WGR when the training dataset consists of many unlabeled data samples.

Figure 9:
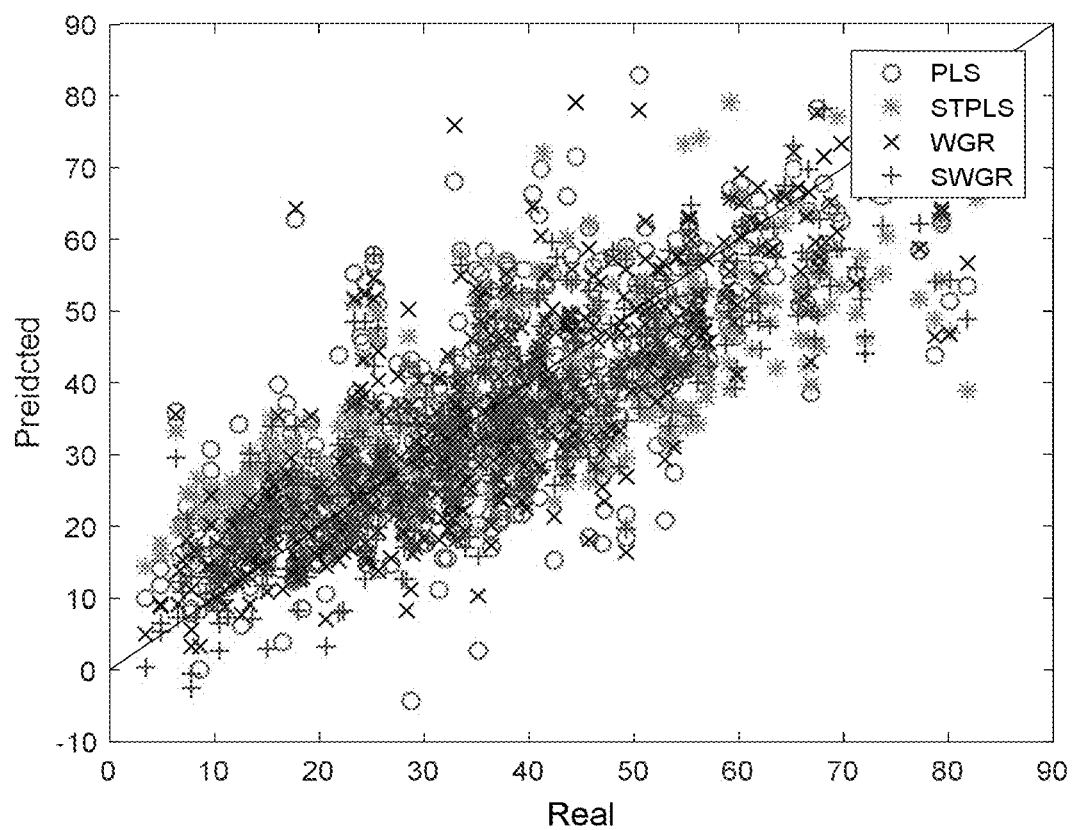
FIG. 9 is scatter plot comparisons for concrete process.
Figure 10A:
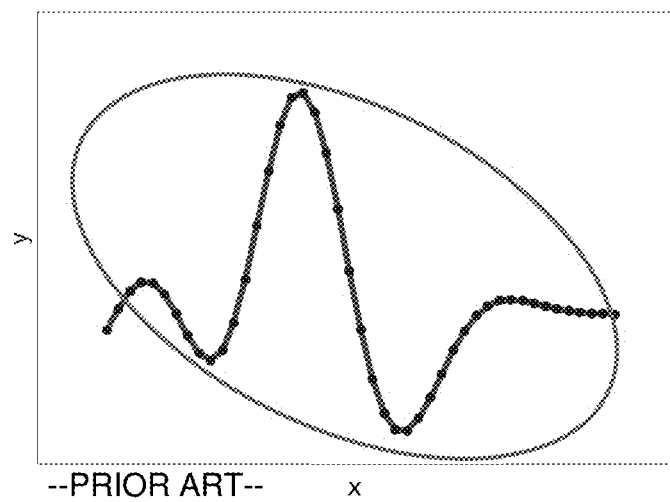
FIG. 10A is a description of a global model.
Figure 10B:
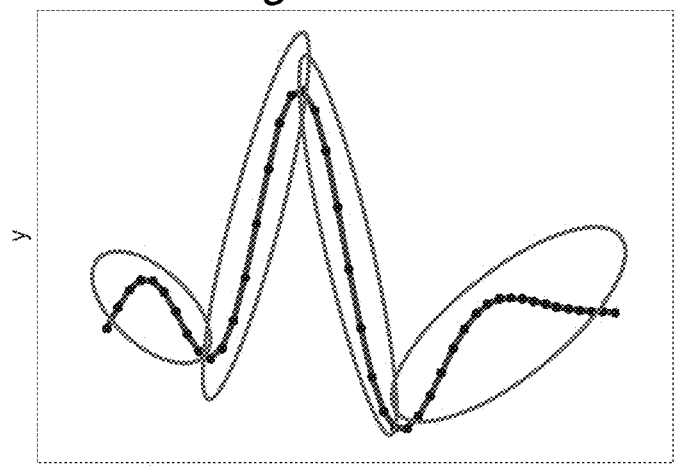
FIG. 10B is a description of a finite mixture model.
Figure 10C:
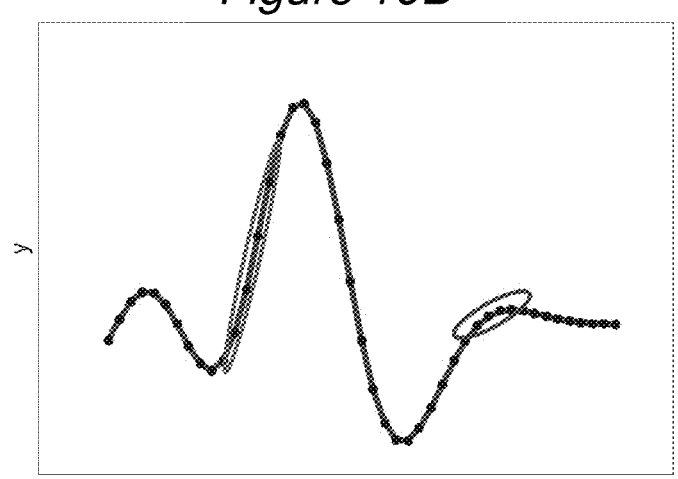
FIG. 10C is a description of a JITL.

Next is provided the $\mu_i^x$ estimation of SWGR and WGR at the 100th testing sample, which are [−0.205, −0.439, 0.456, −0.360, 0.245, 0.243, 0.337, −0.212] and [−0.310, −0.345, 0.474, −0.320, 0.129, 0.392, 0.211, −0.197], respectively. To further highlight the effectiveness of the proposed method, the scatter plot comparisons among former models are provided in FIG. 9. It can be readily seen that the scatters obtained by SWGR are clustered more closely along the black diagonal line compared with other approaches. Therefore, according to the industrial application case studies on a concrete process, the proposed SWGR is an efficient and flexible tool for online quality prediction, which considers the complicated industrial characteristics including nonlinearity, multimodality and limited labeled data samples.

Acknowledgement

This project was funded by the Deanship of Scientific Research (DSR) at King Abdulaziz University, Jeddah, under grant no. (RG-20-135-38) and the National Natural Science Foundation of China (NSFC), under grant no. 51775385. The inventors, therefore, acknowledge with thanks DSR and NSFC for technical and financial support.

While exemplary embodiments of the present invention have been disclosed herein, one skilled in the art will recognize that various changes and modifications may be made without departing from the scope of the invention as defined by the following claims.

What is claimed is:

1. A method of operating a process plant having an industrial process in which some process parameters cannot be directly measured, comprising
receiving a query sample for a process parameter that is not directly measured;
assigning distance-based weights relative to the query sample to both labeled and unlabeled training data samples;
constructing a weighted Gaussian density around the query sample based on a local weighted log-likelihood function that incorporates the distance-based weights of both the labeled and unlabeled training data samples;
calculating a conditional distribution of output variables over input variables based on the constructed Gaussian density;
determining an output value for the query sample from the conditional distribution;
automatically updating a current operating condition of a process plant using the determined output value for the query sample,
wherein each of the labeled data samples has both input and output information, and
wherein each of the unlabeled data samples has only input information.

2. The method of claim 1, further comprising collecting the training data samples for the industrial process.

3. The method of claim 1, wherein the determining step comprises setting the output value for the query sample to a mean of the conditional distribution.

4. The method of claim 1,
wherein the assigning step assigns respective weights $w_i$ for each labeled and unlabeled training data sample according to $$w_i = \exp\left(-\frac{d_i^2}{\eta}\right),$$

where
$\eta$ is a user-set parameter to adjust the decreasing rate,
$d_i$ is distance between each training data sample and the query sample;
wherein the constructing step uses as the weighted log-likelihood function $L(X,y|\theta_l)$ the following $$L(X,y|\theta_l) = -\frac{1}{2}\sum_{j=1}^{n^l} w_j\left[\log(2\pi) + \log|\sum_l| + (z_j-\mu_l)^T\sum_l^{-1}(z_j-\mu_l)\right] -$$

$$\frac{1}{2}\sum_{i=n^l+1}^{n^l+n^u} w_i\left[\log(2\pi) + \log|\sum_l^{xx}| + (x_i-\mu_l^x)^T(\sum_l^{xx})^{-1}(x_i-\mu_l^x)\right]$$

where
$w_j$ and $w_i$ are the weights of the jth labeled sample and ith unlabeled sample;
  wherein the calculating step comprises calculating the conditional distribution p(y|x) based on the joint Gaussian density p(x,y), and substituting $x_*$ for x in p(y|x) to get $p(y_*|x_*)=N(y_*|\mu^{y|x},\Sigma^{y|x})$;
  wherein the determining step determines the output value as $\hat{y}_* = \mu^{y|x}$.

5. A system for operating a process plant having an industrial process in which some process parameters cannot be directly measured, comprising
  a computer readable storage medium comprising instructions;
  one or more processors configured to execute the instructions, the instructions causing the one or more processors to
    receive a query sample for a process parameter that is not directly measured;
    assign distance-based weights relative to the query sample to both labeled and unlabeled training data samples;
    construct a weighted Gaussian density around the query sample based on a local weighted log-likelihood function that incorporates the distance-based weights of both the labeled and unlabeled training data samples;
    calculate a conditional distribution of output variables over input variables based on the constructed Gaussian density;
    determine an output value for the query sample from the conditional distribution;
    send a signal to automatically update a current operating condition of a process plant using the determined output value for the query sample,
  wherein each of the labeled data samples has both input and output information, and
  wherein each of the unlabeled data samples has only input information.

6. The system of claim 5,
  wherein the assigning step assigns respective weights $w_i$ for each labeled and unlabeled training data sample according to $$w_i = \exp\left(-\frac{d_i^2}{\eta}\right),$$

where
$\eta$ is a user-set parameter to adjust the decreasing rate,
$d_i$ is distance between each training data sample and the query sample;
  wherein the constructing step uses as the weighted log-likelihood function $L(X,y|\theta_l)$ the following $$L(X,y|\theta_l) = -\frac{1}{2}\sum_{j=1}^{n^l} w_j\left[\log(2\pi) + \log|\sum_l| + (z_j-\mu_l)^T\sum_l^{-1}(z_j-\mu_l)\right] -$$

$$\frac{1}{2}\sum_{i=n^l+1}^{n^l+n^u} w_i\left[\log(2\pi) + \log|\sum_l^{xx}| + (x_i-\mu_l^x)^T(\sum_l^{xx})^{-1}(x_i-\mu_l^x)\right]$$

where
$w_j$ and $w_i$ are the weights of the jth labeled sample and ith unlabeled sample;
  wherein the calculating step comprises calculating the conditional distribution p(y|x) based on the joint Gaussian density p(x,y), and substituting $x_*$ for x in p(y|x) to get $p(y_*|x_*)=N(y_*|\mu^{y|x},\Sigma^{y|x})$;
  wherein the determining step determines the output value as $\hat{y}_* = \mu^{y|x}$.

* * * * *